United States Patent [19]

Vasta

[11] Patent Number: 4,589,999

[45] Date of Patent: * May 20, 1986

[54] ELECTRICALLY CONDUCTIVE COATING COMPOSITION OF A GLYCIDYL ACRYLIC POLYMER AND A REACTIVE POLYSILOXANE

[75] Inventor: Joseph A. Vasta, Wilmington, Del.

[73] Assignee: E. I. Du Pont de Nemours and Company, Wilmington, Del.

[*] Notice: The portion of the term of this patent subsequent to May 1, 2001 has been disclaimed.

[21] Appl. No.: 687,361

[22] Filed: Dec. 28, 1984

[51] Int. Cl.$^4$ .............................................. H01B 1/24
[52] U.S. Cl. .................................... 252/511; 427/58; 429/233; 429/245; 524/495
[58] Field of Search .......................... 252/511; 427/58; 429/233, 245; 524/495

[56] References Cited

U.S. PATENT DOCUMENTS

| | | | |
|---|---|---|---|
| 3,003,992 | 10/1961 | Mabrey | 260/45.4 |
| 3,062,764 | 11/1962 | Osdal | 260/29.3 |
| 3,069,378 | 12/1962 | Prober | 260/41 |
| 3,203,919 | 8/1965 | Brachman | 260/29.6 |
| 3,468,836 | 9/1969 | Sekmakas | 260/33.6 |
| 3,644,566 | 2/1972 | Kincheloe | 260/826 |
| 3,650,813 | 3/1972 | Nordstrom et al. | 117/93.31 |
| 3,655,602 | 4/1972 | Sekmakas | 260/29.2 |
| 4,098,967 | 7/1978 | Biddick et al. | 429/245 |
| 4,265,801 | 5/1981 | Moody et al. | 260/40 R |
| 4,431,982 | 2/1984 | Monroe et al. | 252/511 |
| 4,446,259 | 5/1984 | Vasta | 523/408 |

FOREIGN PATENT DOCUMENTS 85413 8/1983 European Pat. Off. ............ 252/511

OTHER PUBLICATIONS

Dow Corning Literature Article "Selection Guide to Silicone Paint Resins".
Encyclopedia of Chemical Technology (Kirk—Othmer—vol. 3, pp. 640–663).

Primary Examiner—Paul Lieberman
Assistant Examiner—Robert A. Wax
Attorney, Agent, or Firm—Hilmar L. Fricke

[57] ABSTRACT

A coating composition having a liquid carrier and a binder of a blend of
a. an acrylic polymer containing glycidyl groups and
b. a crosslinkable polysiloxane having attached to the silicone atoms of its backbone alkyl groups, phenyl groups and hydroxyl groups;

the composition contains electrically conductive pigments such as carbon black and graphite to provide an electrically conductive dry film; the composition is used on lead alloy grids of lead acid storage batteries to prolong the life of the battery or to reduce a size and weight of the battery.

10 Claims, No Drawings

ELECTRICALLY CONDUCTIVE COATING COMPOSITION OF A GLYCIDYL ACRYLIC POLYMER AND A REACTIVE POLYSILOXANE

BACKGROUND OF THE INVENTION

This invention relates to an electrically conductive coating composition which forms a chemical and temperature resistant coating.

The prior art shows coating compositions of acrylic silicone copolymers which are crosslinked by heat or radiation after application to a substrate. Patents showing such compositions are as follows: Sekmakas, U.S. Pat. No. 3,468,836, issued Sept. 23, 1969, Kincheloe et al., U.S. Pat. No. 3,644,566 issued Feb. 22, 1972, Nordstrom et al., U.S. Pat. No. 3,650,813 issued Mar. 21, 1972 and Sekmakas U.S. Pat. No. 3,655,602 issued Apr. 11, 1972. Vasta U.S. Pat. No. 4,446,259 issued May 1, 1984 shows a coating composition of an acrylic polymer and a polysiloxane.

The life of conventional lead-acid storage batteries can be increased, the power of these batteries can be increased without an increase in battery size of size of the batteries can be decreased without a decrease in power of the battery by coating lead grids used to make the electrodes of the batteries with a conductive acid resistant coating. To be useful, the coating must adhere to the lead grid, be impervious to the sulfuric acid used in the battery, be electrically conductive and have a low electrical resistance.

None of the above prior art patents suggest or show coatings that are useful to coat grids used in lead acid storage batteries. The unique coating composition of this invention is designed for such use and batteries made with grids coated with the composition have longer life, increased power without an increase in battery size or can be made smaller and lighter without a decrease in power output in comparison to conventional lead acid batteries.

SUMMARY OF THE INVENTION

The coating composition contains about 10–80% by weight of a film-forming binder and 20–90% by weight of a liquid carrier; wherein the binder is a blend of about a. 20–90% by weight, based on the weight of the binder, of an acrylic polymer of about 10–50% by weight, based on the weight of the acrylic polymer, of polymerized glycidyl methacrylate or glycidyl acrylate and 50–90% by weight of other polymerized ethylenically unsaturated monomers such as alkyl methacrylates, alkyl acrylates, styrene or alkyl substituted styrenes or mixtures thereof; wherein the acrylic polymer has a weight average molecular weight of about 10,000–100,000 determined by gel permeation chromatography using polymethylmethacrylate as a standard and b. 10–80% by weight, based on the weight of the binder, of a crosslinkable polysiloxane having attached to silicone atoms of its backbone alkyl groups with 1–6 carbon atoms, phenyl groups and hydroxyl groups and containing sufficient hydroxyl groups to provide a silanol content of about 0.5–7% by weight, based on the weight of the polysiloxane;

wherein the coating composition contains electrically conductive pigments in a pigment to binder weight ratio of about 50/100 to 300/100 and a dry film of the coating composition 25 microns thick has an electrical resistance of 1–20 ohms.

DETAILED DESCRIPTION OF THE INVENTION

The coating composition contains about 10–80% by weight of a film forming binder and 20–90% by weight of a liquid carrier. Preferably, the composition contains 40–70% by weight of the film-forming binder and 30–60% by weight of the liquid carrier. Generally, the liquid carrier is an organic solvent for the binder. The carrier can be aqueous to form a dispersion or a blend of a nonsolvent and solvent for the binder to form a nonaqueous dispersion.

The binder of the composition is a blend of 20–90% by weight of an acryllic polymer and 10–80% by weight of a polysiloxane. Preferably, the composition contains about 50–75% by weight of the acrylic polymer and 25–50% by weight of the polysiloxane.

To be an effective coating for the grids of electric storage batteries, the composition must be electrically conductive and have a low resistance. The composition contains electrically conductive pigments such as carbon black, graphite and the like in a pigment to binder weight ratio of about 50/100 to 300/100 to provide an electrically conductive film. A 25 micron thick film of the composition in its dried state has an electrical resistance of about 1–50 ohms and preferably, 5–20 ohms.

Typical conductive pigments are carbon black pigments such as furnace black, acetylene black and graphite. One preferred carbon black pigment is Gulf acetylene black. Preferably, a mixture of carbon black pigments and finely divided graphite are used. Transition metal oxides also are useful conductive pigments such as lead oxide, magnetite, titanium-suboxides having the formula TiOx where x is less than 2, ruthenium oxide, mixtures of ruthenium oxide and titanium suboxides and the like.

In general, the acrylic polymer must be compatible with the polysiloxane and contain a sufficient number of reactive groups, primarily glycidyl groups, to crosslink with the polysiloxane under ambient temperatures after the coating compositions has been applied to a substrate. The acrylic polymer should have a glass transition temperature of about 20° C. to 50° C. A number average molecular weight of about 2,000 to 20,000, a weight average molecular weight of about 10,000 to 100,000 and a molecular weight distribution of about 2 to 5.

The molecular weight of the acrylic polymer is determined by gel permeation chromatography using polymethylmetacrylate as a standard.

The glass transition temperature of the polymer is determined by differential scanning colorimetry or is calculated.

The acrylic polymer is prepared by conventional polymerizaton procedure in which monomers, catalyst and solvent are charged into a conventional polymerization vessel and reacted at about 60° to 175° C. for about 1–6 hours to form the polymer.

Typical solvents which are used to prepare the acrylic polymer are the following: toluene, ethyl acetate, acetone, methyl isobutyl ketone, methylethyl ketone, ethyl alcohol, mineral spirits, ethylene glycol monoethyl ether acetate, and other aliphatic, cycloaliphatic and aromatic hydrocarbon, ester, ethers, ketones and alcohols which are conveniently used.

About 0.1-4% by weight, based on the weight of the monomers, of the polymerization catalyst is used to prepare the acrylic polymer. Typical catalysts are: azobis-isobutyronitrile, azo-bis(gamma dimethyl valeronitrile), benzoyl peroxide, t-butyl pivalate and the like.

The acrylic polymer contains about 10-50% by weight of glycidyl metacrylate or glycidyl acrylate and 50-90% by weight of other ethylenically unsaturated monomers. Preferably, the acrylic polymer contains about 10-30% by weight of glycidyl methacrylate or glycidyl acrylate and 70-90% by weight of other ethylenically unsaturated monomers.

Typical ethylenically unsaturated monomers that are used to form the acrylic polymer are as follows: alkyl methacrylates having 1-12 carbon atoms such as methyl methacrylate, ethyl methacrylate, butyl methacrylate, hexyl methacrylate, 2-ethylhexyl methacrylate, nonyl methacrylate, lauryl methacrylate, cyclohexyl methacrylate, isodecyl methacrylate, proply methacrylate, phenyl methacrylate, isobornyl methacrylate and the like; alkyl acrylates having 1-12 carbon atoms in the alkyl group such as methyl acrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, cyclohexyl acrylate, isodecyl acrylate, phenyl acrylate, isobornyl acrylate and the like; stryrene, alkyl substituted styrene such as α-methyl styrene, t-butyl stryrene, vinyl toluene.

One preferred acrylic polymer contains about 10-30% by weight of glycidyl metacrylate, 10-20% by weight of styrene, 50-60% by weight of butyl methacrylate and 5-20% by weight butyl acrylate. One particularly preferred acrylic polymer contains 20% by weight glycidyl methacrylate, 15% by weight styrene, 55% by weight butyl methacrylate and 10% by weight butyl acrylate.

The polysiloxane contains the following units

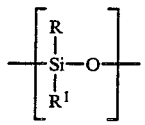

where R and R$^1$ are alkyl group having 1-6 carbon atom, phenyl group or hydroxyl group and contains sufficient number of hydroxyl groups to provide a silanol content of about 0.5-7% by weight. One preferred resin is Dow Corning's D.C. 840 silicone resin which formed by hydrolyzing selected amounts of mono, di and tri methyl chlorosilicone, mono, di and tri phenyl chlorosilicone, mono, di and tri propyl chlorosilicone and mono, di and tri amyl chloro-silicone and the resulting products are condensed to form a resin blend having a silanol content of about 1.9-3% by weight. Other polysiloxanes which give similar results are Bayer's "Baysilone" Resin P150K, Phone-Poulec's "Rhodorsil" 6406 X and General Electric's SR-165. These polysiloxanes are proprietary products but are belived to be formed as described above.

Trace amounts of multivalent metal ions of iron, aluminum, zinc and tin from the above pigments are present in the composition and co-ordinate with the silanol groups of the polysiloxane and catalyze the crosslinking reaction between the acrylic polymer and polysiloxane to provide ambient temperature curing of the coating composition after application to a substrate. If the metal ions complexed with the silanol groups are not present, elevated temperatures are required to cure the composition.

To insure stability of the coating composition during storage, compounds such as acetyl acetone are added in amounts of about 0.75-3% by weight. The acetyl acetone complexes with metal ions in the composition and prevents catalyzation of the crosslinking reaction during storage. Upon application the acetyl acetone volatilizes and allows the metal ions to complex with the silanol groups as described above and catalyze curing of the finish. Other auxiliary stabilizers can also be added such as glycidyloxy alkoxy silanes such as gamma-glycidoxy propyl trimethoxy silane.

The coating composition can be applied using conventional techniques such as spraying, dipping, brushing, roller coating, flow coating and the like and dried at ambient temperatures or baked at temperatures of 50°-250° C. to give a coating about 10-200 microns thick, preferably about 20-100 microns thick.

Typically, the grids of lead acid storage batteries are made from antimony lead alloys or calcium lead alloys. Preferably, a thin coat of an amino silane such as gamma amino propyl trimethoxy silane is applied and then the above composition is applied. Other amino silanes that can be used are N-(2-aminoethyl)-3-amino-propyltrimethoxy silane and 3[2(Vinyl benzylamino)ethylamino]-propyltrimethoxy silane. The composition has excellent adhesion to the amino silane coated alloy grids. Coatings of about 10-200 microns, preferably 20-50 microns are applied to the grid usually by spray application and baked at about 125-175° C.

Batteries made from such coated grids have a life 2-3 times that of batteries made with uncoated grids. Alternatively, thinner grids coated with the composition of this invention can be used which reduces battery size and weight by half to a third without decreasing the life of the battery in comparison to a battery made with uncoated grids. By maintaining the size and weight of the battery to that of a conventional battery but using 2-3 times the number of the thinner coated grids, the power output of the battery can be increased by 2-3 times in comparison to a conventional battery made with uncoated grids.

The following examples illustrate the invention. All parts and percentages are on a weight basis. Molecular weights are determined by gel permeation chromatography using polymethyl methacrylate as a standard.

EXAMPLE

A conductive paint was prepared by blending the following constituents together and charging the resulting blend into a sand mill and grinding 4 passes through the mill:

| | Parts By Weight |
|---|---|
| Acrylic Resin Solution (48.4% volume solids of a polymer of 15% styrene, 10% butyl acrylate, 55% butyl methacrylate and 20% glycidyl methacrylate, the polymer has a number average molecular weight of about 15,000 and a weight average molecular weight of about 42,000) | 546.0 |
| Dow Corning's D.C. 840 proprietary polysiloxane solution (believed | 214.5 |

|  | Parts By Weight |
|---|---|
| to be 60% solids in toluene of a blend of polysiloxanes which are formed by the hydrolysis of select amounts of mono, di and tri methyl, propyl, amyl and phenyl chlorosilicones which are condensed to form a resin having a silanol content of about 1.9-3%.) |  |
| Gamma-glycidoxypropyl trimethoxysilane | 4.3 |
| Carbon black pigment (Gulf acetylene black) | 107.2 |
| Finely divided graphite (Graphite 200-9) | 321.7 |
| Toluene | 1554.7 |
| Methanol | 85.4 |
| Acetylacetone | 28.5 |
| Total | 2862.3 |

The resulting paint has a weight solids of 30% and a pigment to binder weight ratio of 100/100. The paint was reduced to a 25 second spray viscosity measured with a No. 2 Zahn cup with a 80/20 mixture of propylene glycol methyl ether acetate. The paint was sprayed onto a glass panel to a 25 micron dry film thickness and the electrical resistance was measured and was about 5-7 ohms.

A calcium alloy lead grid and an antimony alloy lead grid used in storage batteries were first coated with a 2% solution of gamma-amino propyl trimethoxy silane and dried and then sprayed with the above paint and baked at about 65° C. for about 1 hour. The resulting film was about 40 microns thick and had excellent adhesion to the lead substrate.

The coated lead grids were immersed in sulfuric acid solution and held at 2.3 volts potential for 4 weeks. The coating did not blister or deteriorate and no corrosion of the substrate was noted. In comparison, uncoated lead grids exposed under the same conditions corroded severely.

Lead acid storage batteries made with the coated lead grids are expected to have a life of about 2-3 times that of batteries made with uncoated lead grids. Lead acid storage batteries can be made with grids that are ⅓-½ of the weight of conventional uncoated grids and can be expected to have a life equivalent to that of a conventional battery. Also, lead acid storage batteries can be made of the same size as conventional batteries but with substantially more power since the grids can be made thinner and more grids can be used in the battery; hence, increasing power of the battery.

I claim:

1. A coating composition comprising about 10-80% by weight of a film forming binder and 20-90% by weight of a liquid carrier, wherein the binder consists essentially of a blend of about
   a. 20-90% by weight, based on the weight of the binder, of an acrylic polymer consisting essentially of about 10-50% by weight, based on the weight of the acrylic polymer, of polymerized glycidyl methacrylate or glycidyl acrylate and 50-90% by weight of polymerized ethylenically unsaturated monomers selected from the group consisting of an alkyl methacrylate having 1-12 carbon atoms, an alkyl acrylate having 1-12 carbon atoms, styrene, alkyl substituted styrenes and mixtures thereof, wherein the acrylic polymer has a weight average molecular weight of about 10,000-100,000, and
   b. 10-80% by weight, based on the weight of the binder, of a crosslinkable polysiloxane having the following units:

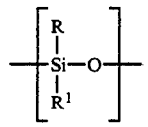

where R and $R^1$ are individually selected from the group consisting of alkyl group having 1-6 carbon atoms, hydroxyl groups and phenyl group and contains a sufficient number of hydroxyl groups to provide a silanol content of about 0.5-7% by weight;

wherein the coating composition contains electrically conductive pigments in a pigment to binder weight ratio of about 50/100 to 300/100 and a dry film of the coating composition 25 microns thick has an electrical resistance of about 1-50 ohms.

2. Coating composition of claim 1 in which the electrically conductive pigments are a mixture of carbon black pigment and finely divided graphite.

3. The coating composition of claim 2 in which the acrylic polymer consists essentially of about
   10-30% by weight of glycidyl methacrylate,
   10-20% by weight of styrene,
   50-60% by weight of butyl methacrylate,
   5-20% by weight of butyl acrylate.

4. The coating composiion of claim 3 in which the acrylic polymer consists of
   20% by weight of glycidyl methacrylate,
   15% by weight styrene,
   55% by weight of butyl methacrylate and
   10% by weight of butyl acrylate.

5. The coating composition of claim 2 containing about 0.75-3% by weight, based on the weight of the composition of acetyl acetone.

6. The coating composition of claim 1 which comprises about 40-70% by weight of a film forming binder and 30-60% by weight of an organic solvent for the binder; in which the binder consists essentially of about
   a. 50-75% by weight, based on the weight of the binder, of an acrylic polymer consisting essentially of about
   (1) 10-30% by weight, based on the weight of the acrylic polymer, of glycidyl methacrylate,
   (2) 10-20% by weight, based on the weight of the acrylic polymer, of styrene,
   (3) 50-60% by weight, based on the weight of the acrylic polymer, of butyl methacrylate and
   (4) 5-20% by weight, based on the weight of the acrylic polymer of butyl acrylate and
   b. 25-50% by weight, based on the weight of the binder, of a polysiloxane having the following units:

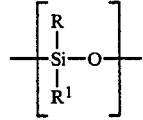

where R and R¹ are individually selected from the group consisting of methyl, propyl, amyl, hydroxyl and phenyl and the polysiloxane contains a sufficient number of hydroxyl groups to provide a silanol content of about 1.9–3.0%
wherein the electrically conductive pigments comprise a blend of carbon black pigment and finely divided graphite and a dry film of the coating 25 microns thick has an electrical resistance of 5–20 ohms.

7. An improved lead acid storage battery having lead alloy grids wherein the improvement comprises having the grids coated with a 10–200 micron thick layer of the dried and cured composition of claim 1.

8. A process for coating lead alloy grids for use in lead-acid electric storage batteries which comprises
  (1) applying a thin coating of an amino silane to the grid and
  (2) applying a coating of the composition of claim 1 and drying the composition to provide a film about 10–150 microns thick.

9. The process of claim 8 in which the lead alloy grid is of an antimony lead alloy or a calcium lead alloy.

10. The process of claim 9 in which the amino silane is gamma aminopropyl trimethoxysilane.

* * * * *